United States Patent [19]

Stec et al.

[11] Patent Number: 5,119,176
[45] Date of Patent: Jun. 2, 1992

[54] SYSTEM AND METHOD FOR DIRECT DIGITAL CONVERSION OF DIGITAL COMPONENT VIDEO SIGNALS TO NTSC SIGNAL

[75] Inventors: Kevin J. Stec, Medford; Gerald R. Iannelli, Marlton, both of N.J.

[73] Assignee: Matsushita Electric Industrial Co., Ltd., Osaka, Japan

[21] Appl. No.: 500,407

[22] Filed: Mar. 28, 1990

[51] Int. Cl.[5] ............ H04N 11/20; H04N 9/67; H04N 9/76
[52] U.S. Cl. ............................ 358/11; 358/30
[58] Field of Search ............... 358/11, 13, 23, 30

[56] References Cited

U.S. PATENT DOCUMENTS

| | | | |
|---|---|---|---|
| 4,542,402 | 9/1985 | Aden | 358/30 |
| 4,982,179 | 1/1991 | Ogawa et al. | 358/23 |
| 5,001,549 | 3/1991 | Holmbo et al. | 358/13 |

Primary Examiner—David K. Moore
Assistant Examiner—Wendy R. Greening

[57] ABSTRACT

A system directly converts digital video component signals to NTSC signal format. The system includes a digital filter which receives digital samples of the video component signal. Coefficients are stored in memory and applied to the taps of the digital filter together with the digital samples of the video component signal to effect conversion of the components to coefficient modified samples of the signals. Further digital processing completes the conversion to the NTSC signal format.

5 Claims, 1 Drawing Sheet

SYSTEM AND METHOD FOR DIRECT DIGITAL CONVERSION OF DIGITAL COMPONENT VIDEO SIGNALS TO NTSC SIGNAL

The invention relates to a system and method for directly converting a digital video component signal to a video NTSC signal.

BACKGROUND OF THE INVENTION

By way of background, there are three levels of signals produced for color television. At the highest quality level, the video signal produced by the television camera has red (R), green (G), blue (B) signal components. At the next level, referred to as the component level, the video signals are referred to as luminance (Y) and two chroma signals, a signal designated CR and a signal designated CB. At the lowest level, the video signals are in the composite format, which includes a luminance (Y) signal and two chroma signals, designated I and Q. These are the NTSC components, where the chroma signals are modulated and added to the luminance signal to form the NTSC composite signal. As used herein, the term digital video component signal refers to a digital representation of the color video signal at the component (Y, CR, CB) level. The term NTSC signal refers to the color video signal at the composite NTSC level in either the digital or analog format.

In a related, presently pending patent application, Ser. No. 424,829, filed on Oct. 19, 1989 in the names of Kevin Stec and Jerome D. Shields, there is described a method and apparatus for converting the digital video component signal into a representation of the digital video composite signal in a standard format known as D2 and for performing the reverse conversion. Those conversions both require rate conversion of the signals, since the digital video component signal uses a clock frequency (Sample Rate) of 13.5 MHz and the D2 signal format uses a clock frequency (Sample Rate) of 14.318 MHz. The D2 signal format is used in television studios for production and in distributing the signal between television studios and production facilities.

The digital video component signal is a better quality signal and can be manipulated more easily than the video composite signal. Thus, the digital video component signal is usually used by professionals for production work to do such things as inserting computer graphics, resizing a picture, overlapping, matting and creating special effects. Once the production work is completed, that signal format must be converted to the NTSC signal format if it is to be displayed via standard television receivers. The present invention provides direct conversion of the digital video component signal to the NTSC signal format at 13.5 MHz for use in television receivers and does not require rate conversion.

In general, conversion between the digital video component signal format and the NTSC signal requires the following steps:

1. Matrixing of the chrominance components of the digital video component signal to form the chrominance components of the NTSC signal in accordance with the following mathematical relationship:

$$I = (1.032) CR + (-0.476) CB$$

$$Q = (0.670) CR + (0.733) CB$$

2. Band limiting of the chroma components in separate low pass filters with different characteristics to produce, respectively, the two chroma component filter outputs, $LPF_I$ and $LPF_Q$.

3. Modulation of the 3.58 MHz color carrier by the two chroma components filter outputs and adding the luminance component to form the digital NTSC signal in accordance with the following mathematical relationship:

Digital Component NTSC = $Y + LPF_I \cos[(2\pi(3.58 \times 10^6 t + 33/360)] + LPF_Q \sin[(2\pi(3.58 \times 10^6 t + 33/360)]$ 4. Converting the digital NTSC siqnal into the analog NTSC signal using a digital-to analog conversion.

There have been systems in the prior art which convert the digital video composite signal into the analog NTSC signal. These systems have involved conversion of digital signals into analog signals at various intermediate stages in the processing and completing the conversion by further processing of the resultant analog signals. These prior art systems suffer from problems associated with analog processing of signals, such as circuitry whose response varies with temperature, the necessity for making frequency, phase, and level adjustments, and the relatively high cost of analog circuitry.

Accordingly, it is an object of the present invention to provide a system for direct conversion between the digital video composite signal and the analog NTSC signal which relies upon digital signal processing and which eliminates the analog circuitry previously required for such conversion. This direct digital conversion in accordance with the invention provides a better quality picture and repeatability of performance not found or achievable with the use of analog circuitry and processing found in the prior art.

It is another object of the invention to provide a digital filter for the chroma signals with enough taps to satisfy the performance criteria of the system. It is a further object of the invention to provide a single digital filter for both luminance and chroma signals. Another object of the invention is to provide a coefficient RAM which stores sets of coefficients for processing the luminance and chroma signals.

BRIEF DESCRIPTION OF THE DRAWINGS

These and other objects and features are realized in accordance with the present invention in which digital processing is used exclusively for conversion of the digital video component signal to the NTSC signal. In the system and method of the invention, chroma signal components of the digital video component signal are applied to the taps of a digital filter. Each tap of the digital filter is coupled to a memory. Each memory has stored in its memory locations a set of coefficients representing a set of digital samples of the 3.58 MHz color subcarrier signal (calculated at the sample rate of the digital video component signal), multiplied by the corresponding chroma low pass filter coefficient for that tap, to achieve low pass filtering, interpolation, and modulation of the chroma signal components. There is one set of chroma coefficients for each tap of the digital filter. The memory is addressed such that the proper coefficients are applied to the taps of the filter toqether with the chroma signal components to achieve the proper phase relationship of the chroma output signal. The outputs of the taps of the digital filter are combined to produce a digital chroma signal. The luminance signal components of the digital video component signal are also applied to the taps of the digital filter. The memory also has stored in memory locations luminance coefficients to provide the proper luminance low pass filter characteristics. There is a set of luminance coefficients, one coefficient for each tap of the digital filter. The luminance coefficients are applied to the taps of the digital filter together with the luminance components of the digital video component signal. The outputs of the taps of the digital filter are combined to produce the digital luminance signal. The digital luminance signal and the digital chroma signal are combined to produce a digital NTSC signal. The digital NTSC signal is thereafter applied to a digital-to-analog converter to produce the analog NTSC signal.

These and other objects and features of the invention will become more apparent from the following description of a presently preferred embodiment of the invention taken in conjunction with the drawing in which.

DETAILED DESCRIPTION OF THE PREFERRED EMBODIMENTS

Figure 1:
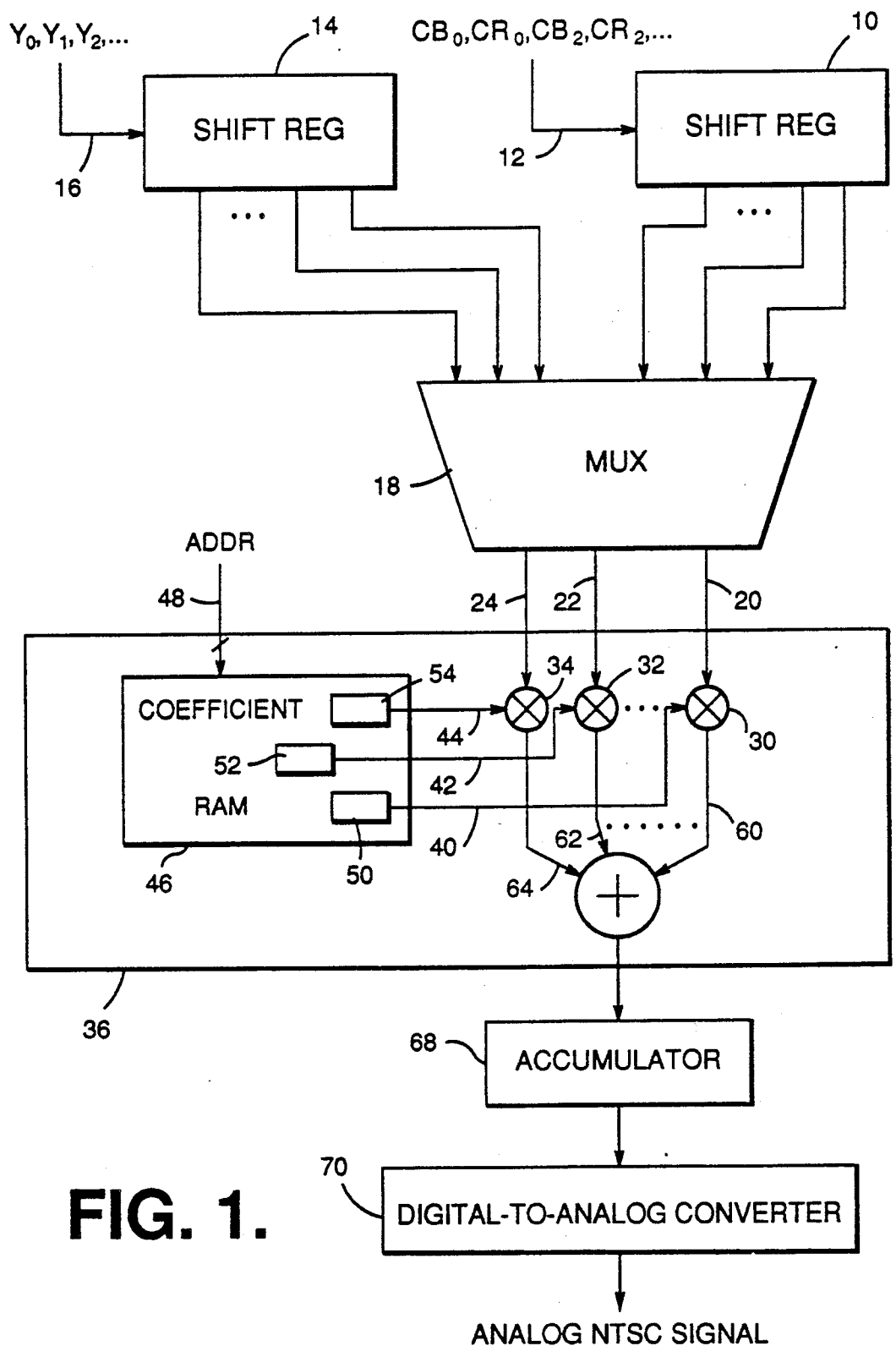
FIG. 1 is a block diagram of the system of the invention for directly converting from the digital video component signal to the analog NTSC format without analog processing of the signals.

Referring to FIG. 1, the system includes shift reqister 10, which receives as its input the two chroma signals, CB, CR, on data line 12, and shift register 14, which receives as its input the luminance signal, Y, on data line 16. It will be understood by those skilled in the art that the chroma signals are sampled at one half the clock frequency of 13.5 MHz, while the luminance signals are sampled at the clock frequency of 13.5 MHz. It will also be understood by those skilled in the art that because of the sampling rates of the chroma and luminance signals, the samples: $Y_0$, $CB_0$, $CR_0$, $Y_2$, $CB_2$, $CR_2$, ..., represent the samples of the color video signal occurring at the same instant in time and the luminance signals $Y_1$, $Y_3$, ..., represent samples of the luminance signal occurring between the samples of the chroma signals. It will also be understood by those skilled in the art that the signal samples are preprocessed such that the signals: $Y_0$, $CB_0$; $Y_1$, $CR_0$; $Y_2$, $CB_2$; $Y_3$, $CR_2$; ..., respectively, are input to shift registers 14, 12, respectively, at the same time.

The outputs of shift registers 10 and 14 are alternately applied to multiplexer (MUX) 18, which alternately outputs on lines 20, ... 22, 23, the chroma signals from shift register 10 and the luminance signals from shift register 14. The outputs from the chroma shift register 10 are such that the CB and CR signals always appear on the same line: for example, CB always appears on line 20 and CR always appears on line 22. The outputs from multiplexer 18 are applied to taps 30, ... 32, 34, of digital filter 36. The signals which appear at the input to taps 30, ... 32, 34, of digital filter 36 are alternately samples of the luminance signal and samples of the two components, CR, CB, of the chroma signal. The other inputs to each tap, 30, ... 32, 34, in digital filter 36 are applied via lines 40, ... 42, 44, from coefficient RAM 46 controlled via address bus 48 to provide a particular coefficient to each tap from sets of coefficients stored in memory blocks 50, ... 52, 54, in RAM 46. The particular coefficient applied to taps 30, ... 32, 34, is dependent upon the input to that tap from multiplexer 18. For the chroma signals, the coefficients represent digital samples of the 3.58 MHz color subcarrier multiplied by the chroma low pass filter coefficient for a particular tap. These coefficients realize a time varying digital low pass filter which varies at the sample rate of the digital video component signal, and which, when applied to a particular tap together with a chroma component, achieve the necessary 3.58 MHz modulation with the proper phase relationship for the output analog NTSC signal.

The sets of coefficients for the chroma signals are determined as follows:

1. The matrix relationship between the I and Q components and the CR and CB components of the video signal is given by the following relationship:

$$I = 1.032\, CR - 0.476\, CB$$

$$Q = 0.670\, CR + 0.733\, CB$$

2. The low pass filter/interpolator mathematical relationship is:

$$LPF_{Ij} = \sum_{i=0}^{N} C_{Ii}\, I_k$$

$$LPF_{Qj} = \sum_{i=0}^{N} C_{Qi}\, Q_k$$

where:
$k = j - i + N/2$
$N + 1 =$ number of filter taps
$j =$ output sample number
(where k is odd, $I = 0$ and $Q = 0$)

3. The modulator mathematical relationship is:
$$C_{MOD} = LPF_I \cos(2\pi*(3.58 \times 10^6 t + 33/360)) + LPF_Q \sin(2\pi*(3.58 \times 10^6 t + 33/360))$$

where: $3.58 \times 10^6 t = 35/132 j$ for $f_s = 13.5$ MHz.

If all of these equations are combined into a single mathematical relationship and the terms rearranged as a function of CR and CB, the following results:

$$\sum_{i=0}^{N} [(1.032\, C_{Ii} \cos 2\pi x + 0.670\, C_{Qi} \sin 2\pi x) \cdot C_{Rk} + (0.733\, C_{Qi} \sin 2\pi x - 0.476\, C_{Ii} \cos 2\pi x) \cdot C_{Bk}]$$

where $x = 35/132 j + 33/360$

This produces a set of coefficients for each tap of digital filter 36, each set consisting of 132 coefficients. Due to symmetry of the discrete modulation, one half of the coefficients are inversions of the other half of the coefficients. Therefore, it is necessary to store only 66 chroma coefficients for each tap of digital filter 36 in memory blocks, 50, ... 52, 54, in RAM 46. The coefficients can be computed using standard mathematical and computer techniques as would be readily understood by those skilled in the art and need not be described in detail here.

The outputs of taps 30, ... 32, 34, which are coefficient modified CR and CB chroma signals represented by the partial sums in equation (1) above and appear on lines 60, ... 62, 64, are applied to adder 66. The output of adder 66 is the combined chroma signal $C_{MODj}$ which is temporarily stored in accumulator 68.

After the chroma signals are processed, multiplexer 18 applies the luminance signal components from shift register 14 to the taps, 30, ..., 32, 34, of digital filter 36.

Sets of coefficients for each tap of the digital filter 36 for the luminance signal components are also stored in a memory block in RAM 46. These coefficients are computed utilizing well known techniques for synthesizing Finite Impulse Responses (FIR) digital filters in accordance with the following:

$$LPF_Y = \sum_{i=0}^{N} C_{YI} Y_k$$

where $C_{YI}$ is a set of coefficients for the Y low pass filter which is computed using standard FIR filter algorithm.

The coefficient modified luminance signals are added together in adder 66 and are thereafter applied to accumulator 68, where the luminance components are added to the stored chroma components to produce a digital NTSC signal output from accumulator 68. The output of accumulator 68 is applied to digital to analog converter 70, which produces the analog NTSC signal.

What has been described is a presently preferred embodiment of the invention. Those skilled in the art will recognize that changes and modifications can be made while remaining within the spirit and scope of the invention as set forth in the appended claims.

What I claim is:

1. A system for direct conversion of a digital video component signal to a video signal in the NTSC format comprising:
    (a) digital filter means for alternately receiving data samples of chroma and lumincance components of the digital component video signal;
    (b) means for storing sets of chroma ad luminance coefficients for said chroma and luminance signal components, said chroma and luminance coefficients being selected to effect conversion of said chroma and luminance components of said digital video component signal to said NTSC format; and
    (c) means for combining said chroma and luminance components of said digital video component signal with said chroma and luminance coefficients to produce a video signal in the NTSC format.

2. A system for direct conversion of a digital video component signal to a signal in NTSC format comprising:
    (a) digital filter having multiple taps;
    (b) memory means for storing sets of coeffient data signals for application to the taps of said digital filter required for the conversion of the digital video component signal to the NTSC signal format;
    (c) means for alternately applying samples of the chroma and luminance components of the digital video component signals to the taps of said digital filter together with predetermined coefficients from said stored sets of coefficients to produce coefficient-modified luminance and chrominance signals; and
    (d) means responsive to said coefficient-modified luminance and chrominance signals for producing a signal in NTSC format.

3. The system of claim 2 wherein said memory mean stores one set of coefficients for the chroma signals for each tap of said digital filter.

4. The system of claim 2 wherein said memory means store one set of coefficients for the luminance signal components for each tap of said digital filter.

5. A method for direct conversion of a digital video component signal to a video signal in the NTSC format comprising the steps of:
    (a) providing coefficient data signals required for the conversion of the digital video component signal to said video signal in the NTSC format;
    (b) combining data samples of chroma and luminance components of the digital video component signals and said coefficient data siqnals to provide coefficient-modified chroma and luminance components of said video signal; and
    (c) combining said coefficient-modified chroma and luminance signals to produce a video signal in the NTSC format.

* * * * *